Aug. 9, 1938.  H. WALTER  2,126,067
RECTIFIER
Filed May 13, 1935
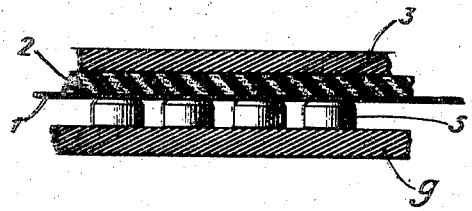
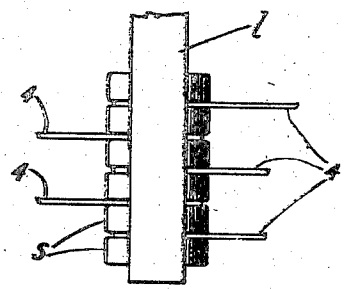
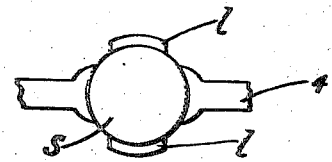
INVENTOR.
HANS WALTER
BY
ATTORNEY.

Patented Aug. 9, 1938

2,126,067

UNITED STATES PATENT OFFICE 2,126,067

RECTIFIER

Hans Walter, Berlin-Siemensstadt, Germany, assignor to Siemens & Halske Aktiengesellschaft, Berlin-Siemensstadt, Germany, a corporation of Germany Application May 13, 1935, Serial No. 21,074
In Germany May 16, 1934

5 Claims. (Cl. 175—366)

This invention relates to an improved rectifier arrangement especially designed to obtain rectifiers in which separate groups of rectifiers or pairs thereof exhibit similar characteristics.

For many purposes in electrical engineering, more particularly in the measuring and communication arts, it is necessary to make available two or more rectifier elements presenting like characteristics, say, measuring devices, rectifier bridge arrangements, modulators, and the like. For instance, in the case of modulator bridges the suppression of the carrier-frequency at the output end of the modulator is only possible if the rectifiers possess sufficiently close characteristics. Now, it has been discovered that it is attended with a good deal of difficulty to obtain rectifiers as coming from the factory of which two or more will exhibit identical characteristics, seeing that there is found wide divergence in reference to widely varying measuring data of the characteristics. For instance, while in some, say, the $R_0$ values may show serious discrepancies, it may be the stopping (non-transmissive) or the conductive values that vary greatly in others.

According to the invention, rectifier arrangements, especially with a view to realizing rectifiers presenting in pairs or in greater number similar characteristics are obtained, by that each rectifier, especially those of the so-called "dry" type (cuprous-oxide, etc.) consists of a large number of paralleled constituent elements arrayed in such a fashion that the characteristic statistically speaking is composed of those of the individual or component elements or elementary units. These constituent rectifiers according to the invention are preferably chosen at random from a certain manufacturing series and then electrically connected together. To be sure, it is known from the prior art that relatively great numbers of dry (cuprous-oxide) rectifier elements (rectifier "pills") are connected in series and combined to result in piles or columns in order that for the constituent rectifiers a voltage division may be obtained. By the paralleling of such constituent rectifiers it would, a priori, seem that no success is obtainable inasmuch as the combination of a plurality of such assemblies would invariably turn out to be more costly than a rectifier of a correspondingly large surface or area. Still, by the paralleling of an assembly of "pills", it is feasible to insure rectifier arrangements and circuits whose characteristics will be made similar to a close degree merely by virtue of statistical averaging of values. Fundamentally speaking—though this would involve a good deal of trouble—it would, for example, be feasible to use from a 20-mm. disk with a zero value $R_0$ of about 700 ohms for a certain circuit scheme, say, a modulator and to locate among a large number of products a similar disk presenting a characteristic that will deviate but little from the other. If, however, instead of the large disk a group of 300 parallel pills is employed of which each one has an R-value of about 200,000 ohms, then, in accordance with known laws of averages, the group rectifiers will present an error or deviation of $$\sqrt{300}$$

i. e., 17 times smaller than that of the individuals. For example, if the disks which are to be assembled to result in a pair, e. g., of a modulator, differ on the average by 20% in any kind of properties at all, then groups of rectifiers which are composed in accordance with this invention, will merely differ by 1.2%. It is not necessary that the rectifiers should all be connected in parallel relation to one another, for it will be evident that parts thereof could be used also in seriation.

The disposition or assembling of the small rectifier elements to result in groups may be accomplished in widely varying ways. In order that circuit (wiring) and solder work may be minimized as much as possible these two exemplified embodiments of the invention will be found to be favorable.

This invention will be more clearly understood by referring to the accompanying drawing in which Fig. 1 shows a cross-section of a parallel arrangement of a plurality of copper discs; Fig. 2 is an elevation of a pile of rectifier discs with connection leads arranged in a group; Fig. 3 is a plan view of Fig. 2.

Referring now in detail to Fig. 1, copper discs S with a cuprous oxide film may be placed upon a metallic base plate $g$ which merely forms the conducting connection. The second coat could consist of a metallic foil $l$ which is pressure-applied upon the constituent disks by the aid of spring cushions 2 consisting of rubber, felt, cork, or similar materials. The counter-pressure plate 3, which is preferably screwed together with the base plate $g$, affords the assembly or combination a firm hold.

According to Figs. 2 and 3, the pills are arranged to result in a pile, the constituent or elementary pills $s$ being supported by strips $l$. The pills are always disposed alternately in such a way that pairs of pills are turned towards each other with their coat or copper face. Between the various pills metal coats or leads 4 are provided and brought out alternately in opposite senses. The coats brought out to one side are interconnected electrically, say, by clamps, soldering, or the like.

The rectifier arrangement according to this invention is not restricted in its practical application to cuprous-oxide rectifiers, but it may be employed also in connection with other rectifiers, say, selenium rectifiers. Also electrolytic rectifiers (for instance, dry cells) are susceptible to the advantageous use of the grouping of elements.

I claim:

1. A rectifier arrangement particularly adapted to cuprous-oxide rectifiers having means for obtaining separate groups of which each separate group possesses substantially the same electrical characteristics, each separate group of rectifiers comprising a relatively large number of single rectifier elements arranged on a metallic base, a metallic foil and resilient means located above said base to connect said rectifier elements in parallel relationship.

2. A rectifier arrangement particularly adapted to cuprous-oxide rectifiers having means for obtaining separate groups of which each separate group possesses substantially the same electrical characteristics comprising a separate group of rectifiers composed of a relatively large number of elements arranged upon a metallic base, a metallic foil located above said base to connect said rectifier elements in parallel relationship, a spring cushion member located above said metallic foil, a pressure plate located above said cushion member and clamped to said base plate to apply pressure to said single rectifier units.

3. A rectifier arrangement particularly adapted to cuprous-oxide rectifiers having means for obtaining separate groups of which each separate group possesses substantially the same electrical characteristics comprising a separate group of rectifiers composed of a relatively large number of elements arranged upon a metallic base, a metallic foil located above said base to connect said rectifier elements in parallel relationship, a rubber cushion member located above said metallic foil, a pressure plate located above said cushion member and clamped to said base plate to apply pressure to said single rectifier units.

4. A rectifier arrangement particularly adapted to cuprous-oxide rectifiers having means for obtaining separate groups of which each separate group possesses substantially the same electrical characteristics comprising a separate group of rectifiers composed of a relatively large number of elements arranged upon a metallic base, a metallic foil located above said base to connect said rectifier elements in parallel relationship, a cork cushion member located above said metallic foil, a pressure plate located above said cushion member and clamped to said base plate to apply pressure to said single rectifier units.

5. A rectifier arrangement particularly adapted to cuprous-oxide rectifiers having means for obtaining separate groups of which each separate group possesses substantially the same electrical characteristics comprising a separate group of rectifiers composed of a relatively large number of elements arranged upon a metallic base, a metallic foil located above said base to connect said rectifier elements in parallel relationship, a felt cushion member located above said metallic foil, a pressure plate located above said cushion member and clamped to said base plate to apply pressure to said single rectifier units.

HANS WALTER.